(12) United States Patent
Watanabe

(10) Patent No.: US 8,763,735 B2
(45) Date of Patent: Jul. 1, 2014

(54) COOLING SYSTEM FOR ELECTRIC VEHICLE AND COOLING METHOD FOR ELECTRICAL COMPONENT

(75) Inventor: Koichiro Watanabe, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 86 days.

(21) Appl. No.: 13/447,654

(22) Filed: Apr. 16, 2012

(65) Prior Publication Data
US 2012/0267178 A1    Oct. 25, 2012

(30) Foreign Application Priority Data
Apr. 25, 2011  (JP) ................. 2011-096956

(51) Int. Cl.
*B60K 11/06*  (2006.01)

(52) U.S. Cl.
USPC ........................ 180/65.1; 180/68.3

(58) Field of Classification Search
USPC ............. 180/68.1, 68.2, 68.3, 68.4, 68.5
See application file for complete search history.

(56) References Cited

U.S. PATENT DOCUMENTS

| | | | | |
|---|---|---|---|---|
| 2,104,772 A | * | 1/1938 | Saunders | 180/68.5 |
| 2,104,773 A | * | 1/1938 | Saunders | 180/68.5 |
| 3,791,482 A | * | 2/1974 | Sykora | 181/229 |
| 4,934,449 A | * | 6/1990 | Watt et al. | 165/41 |
| 5,647,450 A | * | 7/1997 | Ogawa et al. | 180/220 |
| 6,188,574 B1 | | 2/2001 | Anazawa | |
| 6,922,925 B2 | * | 8/2005 | Watanabe et al. | 37/466 |
| 7,051,825 B2 | * | 5/2006 | Masui et al. | 180/68.5 |
| 7,688,582 B2 | * | 3/2010 | Fukazu et al. | 361/690 |
| 2005/0023057 A1 | * | 2/2005 | Maeda et al. | 180/68.1 |
| 2008/0196957 A1 | * | 8/2008 | Koike et al. | 180/68.5 |

FOREIGN PATENT DOCUMENTS

JP    2000-40535 A    2/2000

* cited by examiner

*Primary Examiner* — J. Allen Shriver, II
*Assistant Examiner* — Bridget Avery
(74) *Attorney, Agent, or Firm* — Alston & Bird LLP

(57) ABSTRACT

A cooling system for an electric vehicle is provided, wherein an exhaust air duct extending into a box is disposed in an air outlet of the box disposed in a lower portion of the vehicle interior; an air discharge port of the fan case coupled to the air outlet portion of the cooling duct faces an air inlet of the exhaust air duct with a predetermined gap therebetween in a direction of air flow; and when the air discharge port of the fan case is projected on a plane including the air inlet of the exhaust air duct, the air discharge port of the fan case is opened inside the air inlet of the exhaust air duct and a predetermined gap is formed in a transverse direction to the air flow between the air discharge port of the fan case and the air inlet of the exhaust air duct.

2 Claims, 4 Drawing Sheets

COOLING SYSTEM FOR ELECTRIC VEHICLE AND COOLING METHOD FOR ELECTRICAL COMPONENT

CROSS-REFERENCE TO RELATED APPLICATIONS

The present application claims priority to Japanese Patent Application No. 2011-096956, filed Apr. 25, 2011, which is incorporated herein in its entirety.

BACKGROUND OF THE INVENTION

1. Field of the Invention

The present invention relates to a cooling system for an electric vehicle, and more particularly relates to a cooling system for an electric vehicle with improved cooling performance for an air-cooled electrical component mounted on the electric vehicle and a cooling method for the electrical component.

2. Description of Related Art

An electrical component such as a high-voltage battery, a charger, and a DC/DC converter is mounted on an electric vehicle such as a hybrid vehicle and a plug-in hybrid vehicle. These electrical components generate heat during operation and hence need to be cooled by a cooling system.

A conventional cooling system for an electric vehicle cools an electrical component in such a manner that the electrical component having a heat dissipating fin is disposed inside a box having an air inlet and an air outlet located in substantially the same position; a cooling duct covering the heat dissipating fin of the electrical component is attached thereto to form a substantially U-shaped air passage; and air is circulated through the air passage by an air blowing fan connected to the air inlet (see JP 2000-40535 A).

As disclosed in JP 2000-40535 A, the cooling system for an electric vehicle forcibly circulates air through and over the heat dissipating fins contacting a heat generating portion of the electrical component by the fan for cooling.

The cooling system for electrical components can cool the portions subjected to high temperature simply by circulating air through the heat dissipating fins. However, in a case in which the electrical component is disposed inside the box, the air inside the box is heated to high temperature by heat dissipation from a portion other than the heat dissipating fins of the electrical component. Then, when the electrical component is exposed to high temperature air, the thermal burden imposed on the electrical component increases.

In order to prevent a rise in air temperature around the electrical component, it can be considered to add not only a fan for cooling the electrical component but also a ventilation fan to ventilate the inside of the box. Unfortunately, addition of another ventilation fan is disadvantageous in that the mounting space and costs are increased.

SUMMARY OF THE INVENTION

The present invention provides a cooling system for an electric vehicle and a cooling method for an electrical component for the purpose of improving a cooling performance for the electrical component disposed inside a box without adding a dedicated ventilation fan.

The present invention provides a cooling system for an electric vehicle in which a box including an air inlet and an air outlet is disposed in a lower portion of a vehicle; an electrical component having a heat dissipating fin is disposed in the box; a cooling duct is attached to the electrical component for covering the heat dissipating fin; and a fan case having therein a fan for drawing air is coupled to an air outlet portion of the cooling duct, wherein an exhaust air duct extending into the box is disposed in the air outlet of the box; an air discharge port of the fan case faces an air inlet of the exhaust air duct with a predetermined gap therebetween in a direction of air flow; and when the air discharge port of the fan case is projected on a plane including the air inlet of the exhaust air duct, the air discharge port of the fan case is opened inside the air inlet of the exhaust air duct and a predetermined gap is formed in a transverse direction to the air flow between the air discharge port of the fan case and the air inlet of the exhaust air duct.

Furthermore, the present invention also provides a cooling method for an electrical component in an electric vehicle including a box disposed in a lower portion of a vehicle interior and including an air inlet and an air outlet; an electrical component disposed in the box and having a heat dissipating fin; a cooling duct attached to the electrical component and covering the heat dissipating fin; and a fan case coupled to an air outlet portion of the cooling duct and having therein a fan for drawing air, wherein an exhaust air duct extending into the box is disposed in the air outlet of the box; an air discharge port of the fan case faces an air inlet of the exhaust air duct with a predetermined gap therebetween in a direction of air flow; and a predetermined space formed between the air discharge port of the fan case and the air inlet of the exhaust air duct is set such that the relationship P1>P2>P3 is satisfied when the air drawn by the fan flows from the air discharge port of the fan case to the air inlet of the exhaust air duct, where P1 represents a pressure inside the fan case, P2 represents a pressure around the fan case, and P3 represents a pressure inside the exhaust air duct.

The cooling system for an electric vehicle according to the present invention can efficiently cool the heat dissipating fins of the electrical component by using a fan to draw air inside the cooling duct covering the heat dissipating fins.

Furthermore, when the air drawn by the fan flows from the air discharge port of the fan case to the air inlet of the exhaust air duct, portions other than the heat dissipating fins of the electrical component can be efficiently cooled by a negative pressure generated by the gaps formed therebetween to discharge hot air remaining inside the box containing the electrical component outside the vehicle.

Thus, the cooling system for an electric vehicle according to the present invention can improve the cooling performance for the electrical component installed in the box without adding a new dedicated ventilation fan for ventilating the inside of the box.

DETAILED DESCRIPTION OF PREFERRED EMBODIMENTS

Now, with reference to the accompanying drawings, an embodiment of the present invention will be described.

Embodiment

Figure 6:
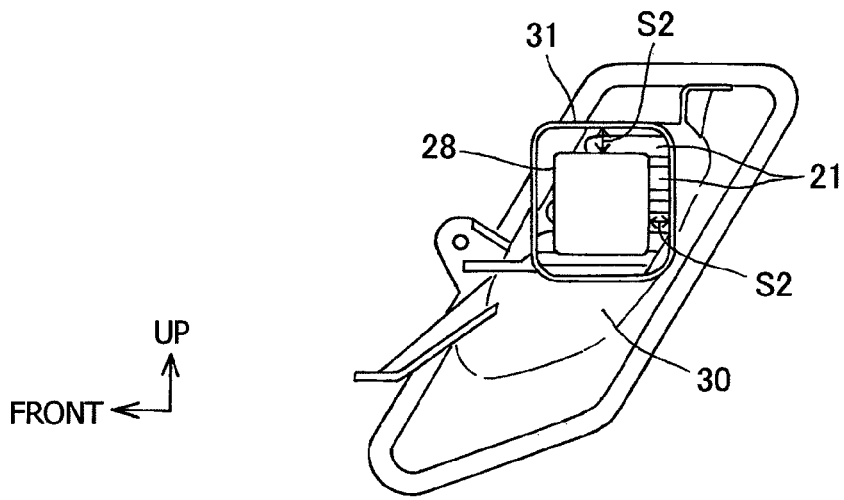
FIG. 6 is a front view of an air inlet of the exhaust air duct illustrating a positional relation to the air discharge port of the fan case (Embodiment)
Figure 7:
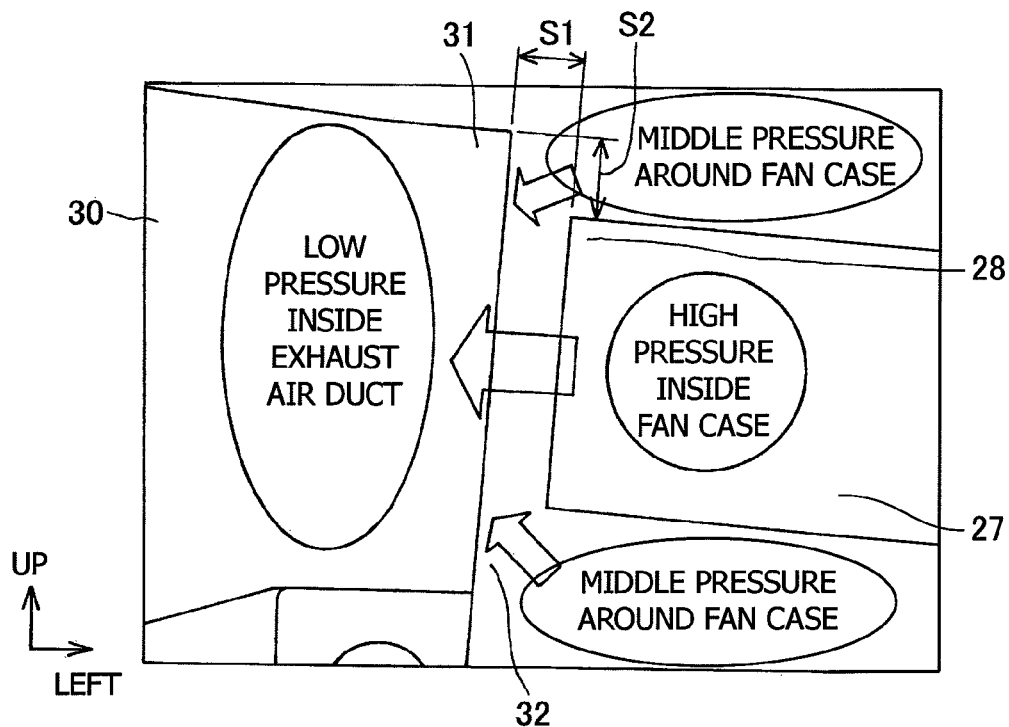
FIG. 7 is an explanatory drawing illustrating an air pressure relationship between the air discharge port of the fan case and the air inlet of the exhaust air duct (Embodiment)
Figure 8:
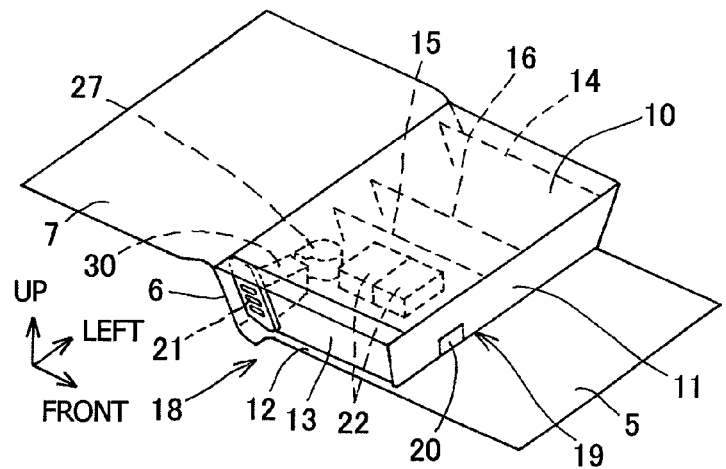
FIG. 8 is perspective view of a box formed between a front floor and a rear floor (Embodiment)
Figure 9:
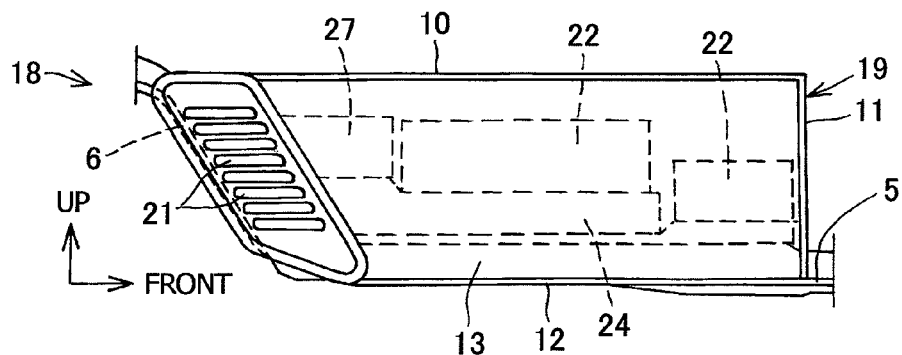
FIG. 9 is an enlarged side view of the box (Embodiment)
Figure 10:
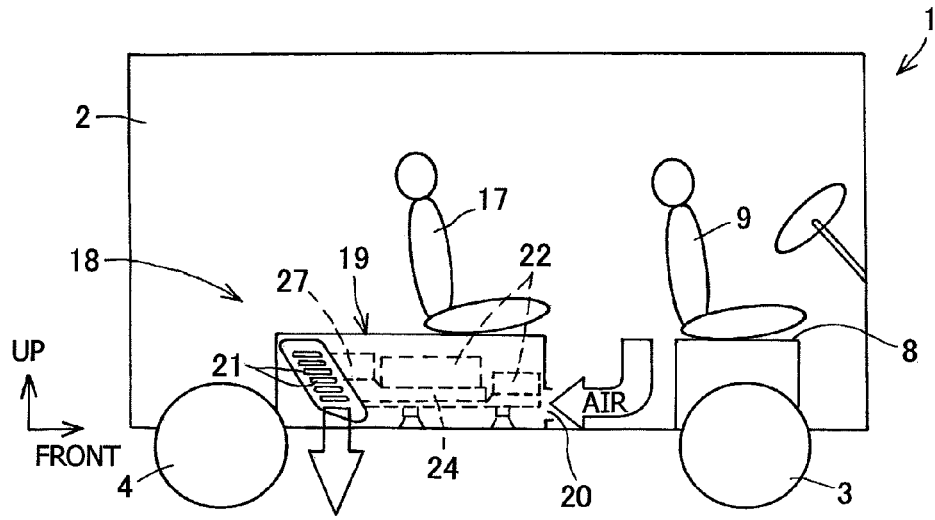
FIG. 10 is a side view of an electric vehicle illustrating an air flow of a cooling system (Embodiment).

FIGS. 1 to 10 illustrate an embodiment of the present invention. FIG. 10 illustrates an electric vehicle 1, a vehicle interior 2, a front wheel 3, and a rear wheel 4. As illustrated in FIGS. 8 and 9, the electric vehicle 1 includes a vertical wall 6 extending upward at a rear end of a front floor 5; and a rear floor 7 extending backward at an upper end of the vertical wall 6. Furthermore, the electric vehicle 1 includes a seat support portion 8 having an inverted U-shaped cross-section and extending in a vehicle width direction at a front portion of the front floor 5; and a front seat 9 mounted thereon.

Furthermore, the electric vehicle 1 includes an upper floor 10 extending frontward parallel to the front floor 5 from an upper end of the vertical wall 6; and a front wall 11 extending downward from a front end of the upper floor 10 and connecting to the front floor 5. Furthermore, the electric vehicle 1 includes a rear portion 12 of the front floor 5 located between the vertical wall 6 and the front wall 11; a right side wall 13 and a left side wall 14 disposed on respective opposite sides of the rear portion 12 in the vehicle width direction and extending up to the upper floor 10; a right side partition wall 15 and a left side partition wall 16 disposed in between the right side wall 13 and the left side wall 14; and a rear seat 17 disposed on the upper floor 10.

The electric vehicle 1 includes a box 19 that is defined by the right side wall 13, the right side partition wall 15, and the vertical wall 6, the upper floor 10, the front wall 11 and the rear portion 12 located between the right side wall 13 and the right side partition wall 15, and forms a part of a cooling system 18. The box 19 is disposed on a right side of a lower portion of the vehicle interior 2 in the vehicle width direction. The box 19 includes an air inlet 20 located in substantially the center of the front wall 11 and facing inside the vehicle interior 2; and an air outlet 21 located on a rear side of the right side wall 13 and facing outside the vehicle. The box 19 includes thereinside an electrical component 22 such as a high-voltage battery, a charger, and a DC/DC converter.

Figure 1:
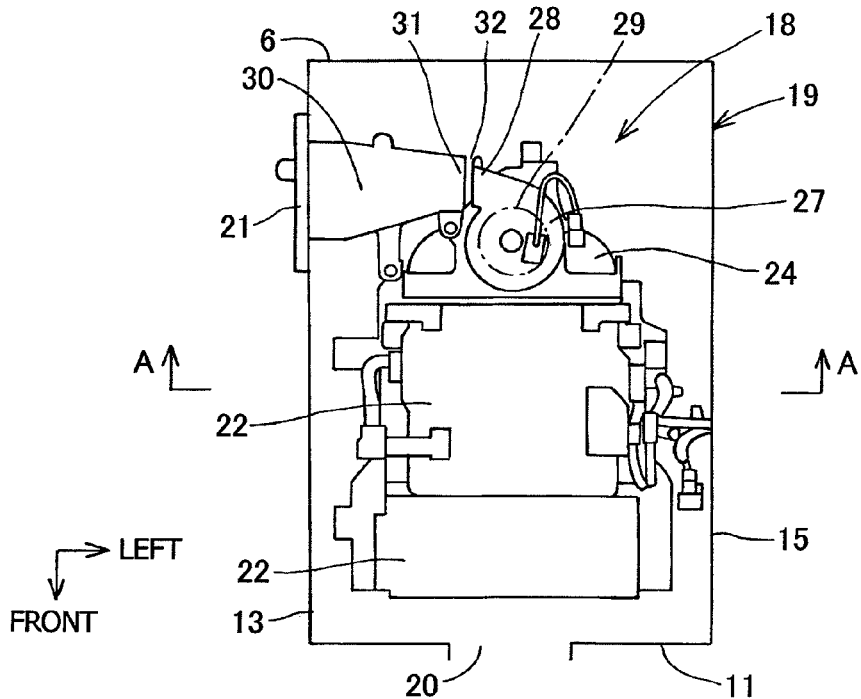
FIG. 1 is a plan view of a box containing an electrical component (Embodiment)
Figure 2:
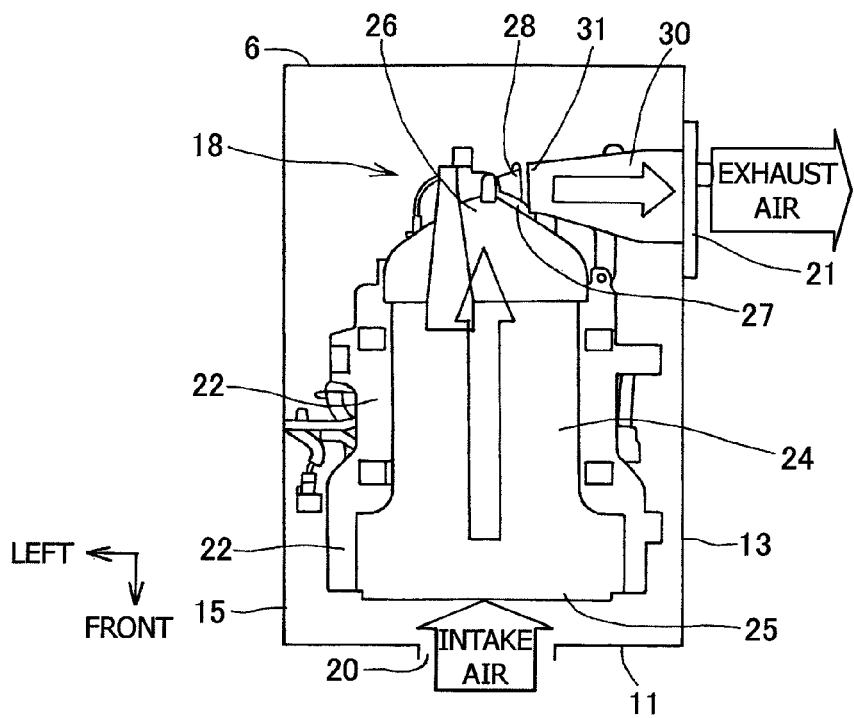
FIG. 2 is a bottom view of the box containing the electrical component (Embodiment)
Figure 3A:
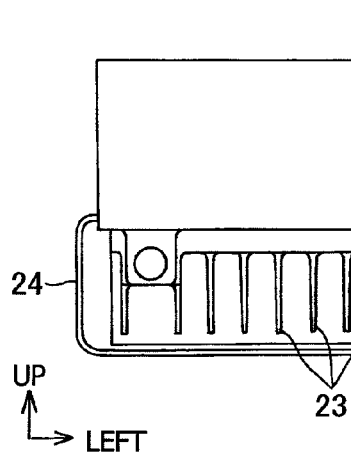
FIG. 3A is a sectional view taken along line A-A of FIG. 1.
Figure 3B:
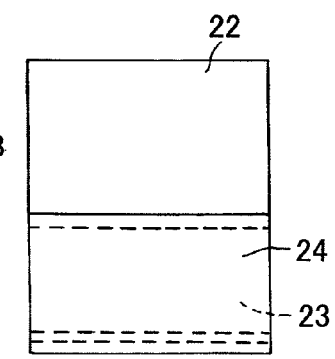
FIG. 3B is a side view viewed from arrow B in FIG. 3A (Embodiment)

As illustrated in FIGS. 3A and 3B, the electrical component 22 has heat dissipating fins 23 on the underside thereof. The electrical component 22 has a cooling duct 24 covering the heat dissipating fins (heat radiating fins) 23. As illustrated in FIGS. 1 and 2, in the cooling duct 24, an air inlet portion 25 is disposed facing the air inlet 20 of the front wall 11 and a suction side of a fan case 27 is coupled to an air outlet portion 26. The fan case 27 includes an air discharge port 28 facing an air outlet 21 of the box 19; and a fan 29 for drawing air inside. The air outlet 21 of the box 19 has an exhaust air duct 30 extending toward the fan case 27 disposed in the box 19. The exhaust air duct 30 has an air inlet 31 facing the air discharge port 28 of the fan case 27.

Figure 4:
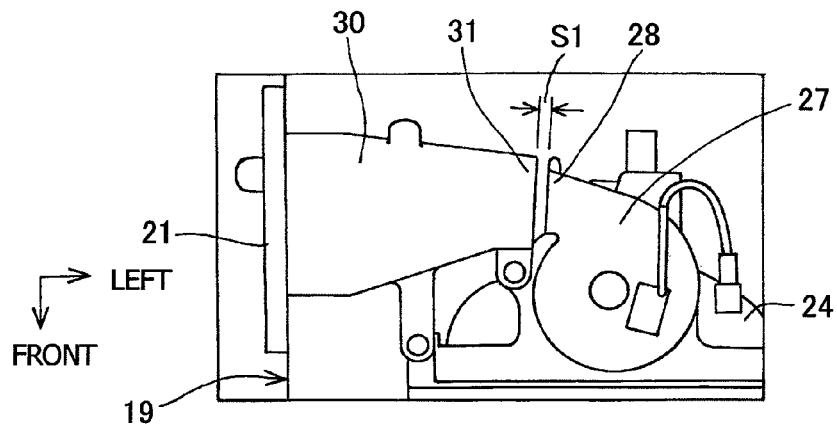
FIG. 4 is a plan view of a fan case and an exhaust air duct (Embodiment)
Figure 5:
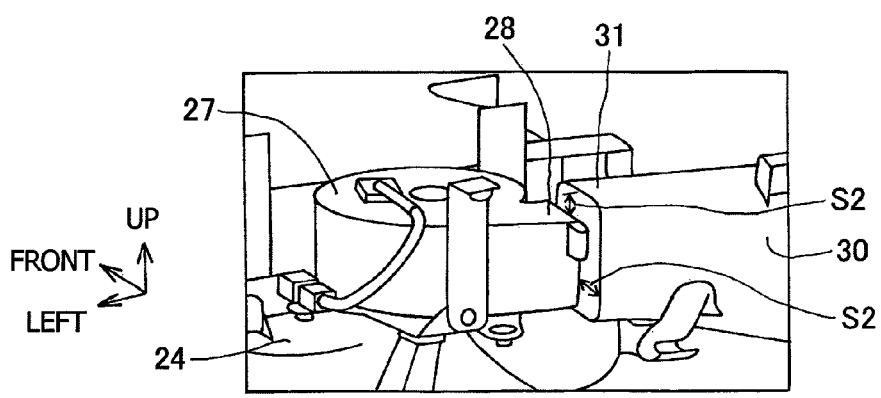
FIG. 5 is a perspective view of the fan case and the exhaust air duct (Embodiment)

In the cooling system 18, as illustrated in FIG. 4, the air discharge port 28 of the fan case 27 faces the air inlet 31 of the exhaust air duct 30 with a predetermined gap S1 therebetween in a direction of the air flow. Furthermore, in the cooling system 18, as illustrated in FIGS. 5 and 6, when the air discharge port 28 of the fan case 27 is projected on a plane including the air inlet 31 of the exhaust air duct 30, the air discharge port 28 of the fan case 27 is opened to inside the air inlet 31 of the exhaust air duct 30, and a predetermined gap S2 is formed in a transverse direction to the air flow between the air discharge port 28 of the fan case 27 and the air inlet 31 of the exhaust air duct 30. Thus, the cooling system 18 forms a predetermined space 32 including the gaps S1 and S2 between the air discharge port 28 of the fan case 27 and the air inlet 31 of the exhaust air duct 30.

The cooling system 18 can efficiently cool the heat dissipating fins 23 of the electrical component 22 by using a fan 29 disposed in the fan case 27 coupled to the cooling duct 24 to draw air inside the cooling duct 24 covering the heat dissipating fins 23 and discharge the air through the exhaust air duct 30 to outside the vehicle.

Furthermore, thanks to the predetermined space 32 formed between the air discharge port 28 of the fan case 27 and the air inlet 31 of the exhaust air duct 30 as illustrated in FIG. 7, the relationship P1>P2>P3 is satisfied in the cooling system 18 when the air drawn by the fan 29 flows from the air discharge port 28 of the fan case 27 to the air inlet 31 of the exhaust air duct 30, where P1 represents a pressure inside the fan case 27, P2 represents a pressure around the fan case 27, and P3 represents a pressure inside the exhaust air duct 30.

Thus, the cooling system 18 uses a negative pressure (differential pressure) generated by the gaps S1 and S2 formed between the fan case 27 and the exhaust air duct 30 to discharge hot air remaining inside the box 19 containing the electrical component 22 to outside the vehicle interior 2. Accordingly, the cooling system 18 can cool portions other than the heat dissipating fins 23 of the electrical component 22 by taking in the air inside the vehicle interior 2 through the air inlet 20 into the box 19.

Thus, the cooling system 18 can improve the cooling performance for the electrical component 22 installed in the box 19 without adding a new dedicated ventilation fan for ventilating the inside of the box 19.

Furthermore, the conventional cooling system has a problem in that when a fan case 27 is directly bonded to an exhaust air duct 30, the bonded portion between the fan case and the exhaust air duct needs to have a structure for preventing backlash and air leaks, thus complicating the bonding structure. In contrast to this, the cooling system 18 has gaps S1 and S2 formed between the air discharge port 28 of the fan case 27 and the air inlet 31 of the exhaust air duct 30, which can simplify the structure of the bonded portion between the fan case 27 and the exhaust air duct 30, leading to an improvement in manufacturability and a reduction in costs, which is advantageous in terms of assembly.

Furthermore, the cooling system 18 is structured such that the cooling air generated by the fan 29 is discharged outside the vehicle interior 2, thereby to guide the air inside the vehicle interior 2 into the box 19 and then to discharge it outside the vehicle interior 2. Thus, the inside of the vehicle interior 2 can be ventilated during charging of a battery mounted on the electric vehicle 1. Particularly in summer, the temperature inside the vehicle interior 2 rises during charging of the electric vehicle 1 if the windows are closed, but the cooling system 18 can alleviate the temperature rise. Thus, the cooling system 18 can improve the ventilation performance inside the vehicle interior.

The cooling system for an electric vehicle according to the present invention can improve the cooling performance for an electrical component installed in the box and can be applied to cool a heat generating device installed in the box of not only an electric vehicle but also a vehicle mounting an internal combustion engine.

What is claimed is:

1. A cooling system for an electric vehicle comprising:
   a box disposed in a lower portion of a vehicle interior and including an air inlet and an air outlet;
   an electrical component disposed in the box and having a heat dissipating fin;
   a cooling duct attached to the electrical component and covering the heat dissipating fin;
   a fan case coupled to an air outlet portion of the cooling duct and having therein a fan for drawing air; and
   an exhaust air duct disposed in the air outlet of the box and extending into the box, an air discharge port of the fan case facing an air inlet of the exhaust air duct with a predetermined gap therebetween in a direction of air flow, wherein
   when the air discharge port of the fan case is projected on a plane including the air inlet of the exhaust air duct, the air discharge port of the fan case is opened inside the air inlet of the exhaust air duct and a predetermined gap is formed in a transverse direction to the air flow between the air discharge port of the fan case and the air inlet of the exhaust air duct, and hot air remaining inside the box is discharged to outside the vehicle interior by a negative pressure generated by a gap formed between the fan case and the exhaust air duct.

2. A cooling method for an electrical component in an electric vehicle including a box disposed in a lower portion of a vehicle interior and including an air inlet and an air outlet; an electrical component disposed in the box and having a heat dissipating fin; a cooling duct attached to the electrical component and covering the heat dissipating fin; a fan case coupled to an air outlet portion of the cooling duct and having therein a fan for drawing air, and an exhaust air duct disposed in the air outlet of the box and extending into the box, an air discharge port of the fan case facing an air inlet of the exhaust air duct with a predetermined gap therebetween in a direction of air flow, the method comprising:
   setting a predetermined space formed between the air discharge port of the fan case and the air inlet of the exhaust air duct such that the relationship $P1>P2>P3$ is satisfied when the air drawn by the fan flows from the air discharge port of the fan case to the air inlet of the exhaust air duct, where P1 represents a pressure inside the fan case, P2 represents a pressure around the fan case, and P3 represents a pressure inside the exhaust air duct, and hot air remaining inside the box is discharged to outside the vehicle interior by a negative pressure generated by a gap formed between the fan case and the exhaust air duct.

* * * * *